Figure 1:
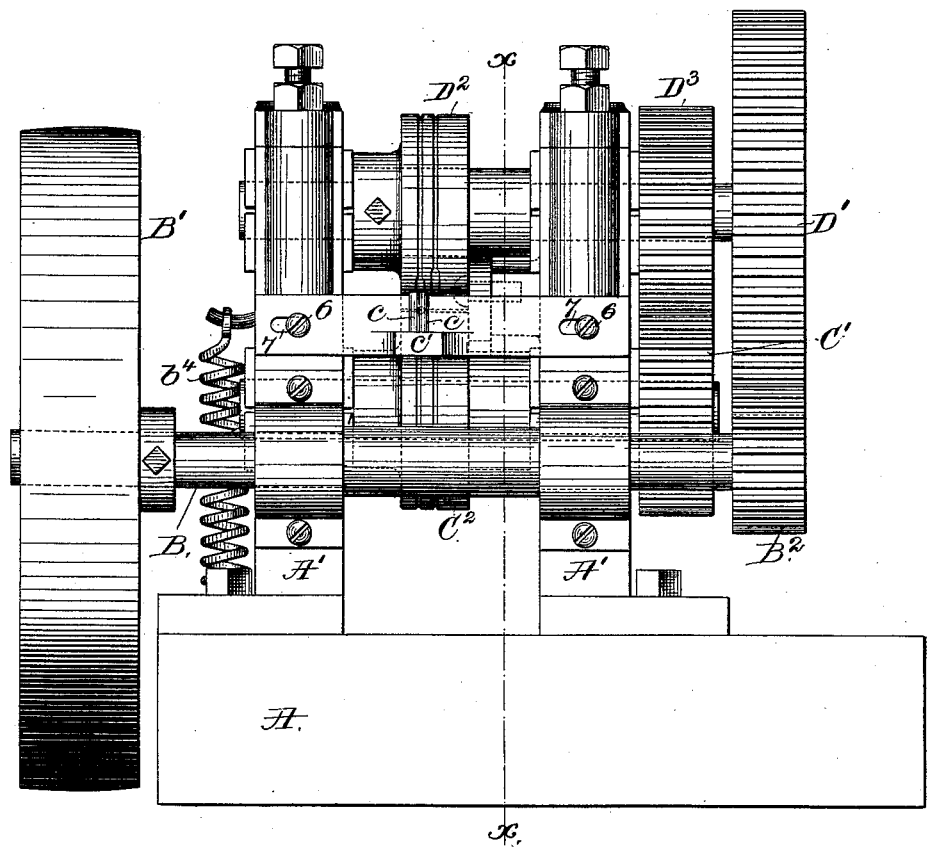

(No Model.)

2 Sheets—Sheet 1.

D. A. RITCHIE.
WIRE CUTTING MACHINE.

No. 432,565.

Patented July 22, 1890.

(No Model.) 2 Sheets—Sheet 2.
D. A. RITCHIE.
WIRE CUTTING MACHINE.
No. 432,565. Patented July 22, 1890.
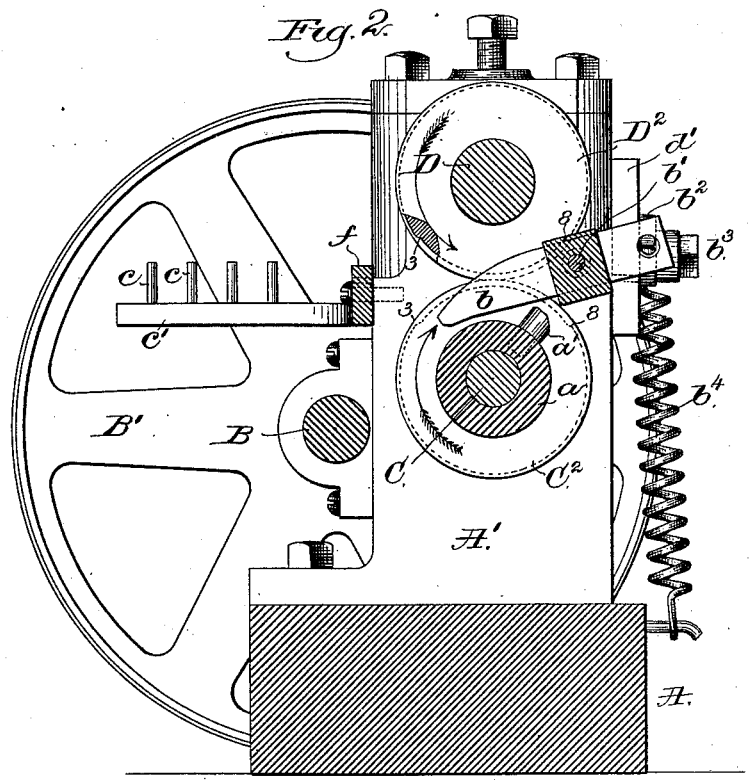
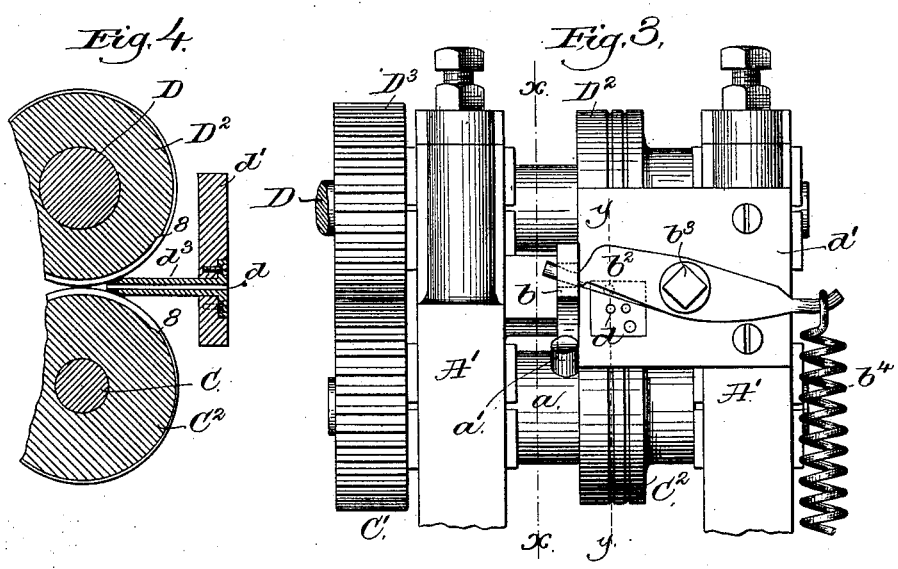
Witnesses.
John F. C. Printlock
Frederick L. Emery
Inventor:
David A. Ritchie,
by Crosby & Gregory
Attys.

UNITED STATES PATENT OFFICE.

DAVID A. RITCHIE, OF CAMBRIDGE, MASSACHUSETTS.

WIRE-CUTTING MACHINE.

SPECIFICATION forming part of Letters Patent No. 432,565, dated July 22, 1890.

Application filed November 9, 1889. Serial No. 329,804. (No model.)

*To all whom it may concern:*

Be it known that I, DAVID A. RITCHIE, of Cambridge, county of Middlesex, State of Massachusetts, have invented an Improvement in Wire-Cutting Machines, of which the following description, in connection with the accompanying drawings, is a specification, like letters on the drawings representing like parts.

This invention has for its object the production of a novel machine for automatically cutting wire into determined lengths.

My improved machine contains two sets of shouldered rolls to catch and feed the wire, and combined therewith is a cutting mechanism, and preferably a wire-straightening device.

Figure 1, in front elevation, represents a wire-cutting machine embodying my invention; Fig. 2, a section thereof in the line $x$; Fig. 3, a partial rear elevation of the machine shown in Fig. 1, and Fig. 4 a sectional detail on line $y\ y$.

The bed-plate A has uprights A' to support the bearings for the shafts B C D. The main shaft B has a belt-pulley B' and a pinion $B^2$, which latter engages a toothed gear D' on the upper shaft D, provided with the shouldered feed-roll $D^2$. The shaft D has fixed to it a gear $D^3$, which engages a gear C' on and rotates the under shaft C, having attached to it the co-operating shouldered roll $C^2$. A collar $a$ on the shaft has a pin or projection $a'$, which in the rotation of the said shaft strikes a lever $b$, pivoted at $b'$ and engaging at its other end a cutter $b^2$, (shown as pivoted at $b^3$, and as normally held out of cutting position by a spring $b^4$.) The rolls $D^2$ $C^2$ are herein shown as having each two sets of grooves; but instead they may have one or any desired number of grooves, the said grooves differing in size according to the size of the wire to be fed. These grooves, as shown best in dotted lines, Fig. 2, are of unequal depth, so as to form shoulders or leave portions of the grooves for a greater or less part of the circumference of the rolls deeper than other parts.

The wire to be fed to the rolls will preferably be passed between pins $c\ c$, mounted on a bar $c'$, to constitute a straightening device. The wire inserted in the grooves of the rolls will be grasped by the parts of the rolls when the grooves are of least depth, the said portions varying in length according to the length of the wire to be fed. The end of the wire beyond or at the rear of the said shouldered rolls is led through a suitable hole, as $d$, in a shear-plate $d'$, attached to the upright $a'$, the cutter $b^2$ cutting close to the face of the said plate.

Assuming the rolls to be rotating in the direction of the arrows thereon in Fig. 2, the rolls will not catch the wire to feed it until the shoulders 3 catch the wire at the rear of the bar $f$, which, by the way, is adjustable by the screws 6 and slots 7, and the rolls will continue to feed the wire until the shoulders 8 (shown by dotted lines) pass the wire, and then the projection $a'$ strikes the lever $b$ and actuates the cutter. The machine started will continue to cut the wire in measured lengths and deliver the same in substantially straight pieces.

The plate $d'$ between the guiding-holes $d$ and the rolls is provided with a support $d^3$ for the wire on its passage from the rolls through the holes $d$ to be cut off, the said support being necessary to prevent the wire from buckling or bending.

I claim—

1. The shafts C D, their attached shouldered rolls having a series of grooves therein of unequal depth to form the shoulders, combined with positively-operated cutting mechanism to sever the wire while it is in the deeper portion of the grooves, substantially as described.

2. The shouldered rolls, wire-straightening pins $c$, between which the wire is passed, and the laterally-adjustable bar $f$, which carries the said pins, combined with positively-actuated intermittent cutting mechanism operatively connected with one of said rolls, to operate substantially as described.

3. The shafts C D, their attached shouldered rolls, the projection $a'$, rotating with one of said shafts, and the pivoted lever $b$, with which said projection co-operates, combined with the shear-plate $d'$, and the cutter-lever $b^2$, adjacent to the face of said plate, to operate substantially as described.

4. The shouldered rolls and the wire-straightening devices adjacent thereto, combined with the shear-plate $d'$, having holes $d$ therein, through which the wire is led, the wire-support $d^3$, intermediate said rolls and shear-plate, the cutting-lever $b^2$, and means to operate it, whereby the wire is cut as it emerges from the shear-plate, substantially as described.

In testimony whereof I have signed my name to this specification in the presence of two subscribing witnesses.

DAVID A. RITCHIE.

Witnesses:
GEO. W. GREGORY,
E. J. BENNETT.